United States Patent Office 2,775,590
Patented Dec. 25, 1956

2,775,590

PROCESS FOR PREPARATION OF CERTAIN OXAZINES AND PIPERIDINOLS

Claude J. Schmidle, Moorestown, N. J., assignor to Rohm & Haas Company, Philadelphia, Pa., a corporation of Delaware No Drawing. Application March 27, 1956, Serial No. 574,110

6 Claims. (Cl. 260—244)

This invention deals with a process for preparing basic nitrogen compounds, in particular 6-methyl-6-phenyl-tetrahydro-1,3-oxazines and 4-phenyl-4-piperidinols. The process comprises bringing together and reacting α-chlorocumene, formaldehyde, and ammonia (and/or ammonium chloride or bromide) or a primary amine.

It has been shown that hydrocarbons having a terminal ethylenic linkage, formaldehyde, and ammonia or a primary amine react in the presence of hydrogen chloride to give a number of types of basic nitrogen compounds. In my present process I do not have to use an olefinically unsaturated starting material, thus avoiding the problem of preparing α-methylstyrene. Furthermore, I do not need to supply hydrochloric acid. My process is thus economical and simple and leads directly not only to 6-methyl-6-phenyltetrahydro-1,3-oxazines but also to a favorable proportion of 4-phenyl-4-piperidinols, which are pharmaceutically active substances, providing analgesic and hypnotic actions. The mixtures are useful corrosion inhibitors. Yet, the mixtures are resolvable to give both kinds of products. Either the mixture or the components are useful as textile finishing agents, in particular being useful as gas-fading inhibitors for cellulose acetate.

In place of α-chlorocumene itself there may be used α-chlorocumenes which have inert ring substituents, such as methyl, chloro, or ethyl.

To supply the nitrogen-containing function there is used ammonia, or the equivalent as ammonium hydroxide or ammonium chloride or bromide, or a primary amine. The alkylamines are especially useful starting materials, preferably monoalkylamines of not over eight carbon atoms from methylamine to octylamine but there may likewise be used cyclohexylamine, methylcyclohexylamine, benzylamine, or other cycloalkyl and aralkyl amines. Aniline reacts to give some of the desired products and also resin in considerable proportion. Non-aromatic primary amines are thus preferred, i. e., amines in which there is no aromatic ring directly attached to the amino group.

Formaldehyde may be used in the form of aqueous solutions, such as the 30 to 40% solutions of commerce, or of solutions in lower alcohols, in which it may exist in the form of hemiformals, or of revertible polymers. Mixtures of two or more of these forms may be used.

Formaldehyde and ammonia or primary amine may first be mixed, in which case there may be a reaction of the two kinds of materials. This does no harm as the resulting product acts to supply the desired starting materials when mixed with α-chlorocumene and offers the advantage that water can be partly eliminated from the reaction mixture after the first stage of the reaction.

The order of mixing is not critical, however, and the three starting materials can also be brought together by adding ammonia or amine to α-chlorocumene followed by addition of formaldehyde. Likewise, formaldehyde and α-chlorocumene can be first mixed and ammonia or primary amine added to the mixture. Also, all three starting materials can be brought together simultaneously.

The formation of the 6-methyl-6-phenyltetrahydro-1,3-oxazines and 4-phenyl-4-piperidinols theoretically requires two moles of formaldehyde per mole each of α-chlorocumene and ammonia or primary amine, and this is a convenient ratio for the procedure, although excess of formaldehyde is commonly used. If these conditions are not utilized the reaction still proceeds to the basic nitrogen compounds but with, of course, decreased yields.

The reaction of this invention is carried out between 20° and 100° C. or more. After the three types of reactants are brought together in any desired order, the reaction mixture is stirred and heated to permit the reactions to proceed toward completion. If desired, unreacted starting material can be removed as by extracting at this point, although this is not essential. The reaction mixture is made basic as by addition of an alkali, such as sodium or potassium hydroxide or sodium carbonate, or other base, particularly an inorganic base, to liberate the basic nitrogen compounds, which are then taken off in an organic layer, which may be washed with water and dried or stripped of volatile material by heating under reduced pressure. In many cases the products are used as thus obtained. Again, the organic layer may be resolved as by distillation under reduced pressure. In this way there can be obtained a fraction containing the 6-methyl-6-phenyltetrahydro-1,3-oxazine and another containing the 4-phenyl-4-piperidinol, which can frequently be purified by recrystallization.

The following examples are presented to illustrate this invention. They are not to be construed as limitations to the individual materials, temperatures, proportions, or other specific factors shown. Parts are by weight unless otherwise stated.

Example 1

To 78 parts of stirred, cooled 40% aqueous methylamine is slowly added 81 parts of 37% aqueous formaldehyde followed by 32 parts of paraformaldehyde. The mixture is slowly warmed to 70° C. while the formaldehyde goes into solution. The mixture is cooled to 30° C. and there is slowly added 154 parts of α-chlorocumene while the temperature is maintained at 30°–40° C. by external cooling. After the addition is complete, the mixture is allowed to warm to 62° C. Heat is applied and the mixture is stirred at 95°–100° C. for two and one-half hours, cooled, diluted with 500 parts of water, extracted with toluene, and made basic with excess 50% sodium hydroxide solution. The basic nitrogen compounds which separate are taken up in toluene, dried over potassium carbonate, and distilled to give the following fractions:

A. 6 parts, boiling point 60°–90° C./1.75 mm. Hg
B. 56 parts, boiling point 90°–105° C./1.75 mm. Hg NE 194
C. 12 parts, boiling point 105°–110° C./1.75 mm. Hg
D. 10 parts, boiling point 110°–120° C./1.75 mm. Hg
E. 38 parts, boiling point 120°–140° C./1.75 mm. Hg—crystallized Residue 22 parts.

Fraction B is redistilled to give 33 parts of pure 3,6-dimethyl-6-phenyltetrahydro-1,3-oxazine, boiling point 93°–95° C./1.6 mm. Hg; $n_D^{25}$, 1.5305.

Neutral equivalent.—Found 190; theory 191.

Analysis:

|  | Percent C | Percent H | Percent N |
|---|---|---|---|
| Found | 76.31 | 8.99 | 7.44 |
| Theory | 75.35 | 8.96 | 7.33 |

Fraction E is recrystallized from toluene to give white, crystalline 1-methyl-4-phenyl-4-piperidinol, M. P. 113°–115° C.

Analysis:

|  | Percent C | Percent H | Percent N |
|---|---|---|---|
| Found | 75.37 | 9.14 | 7.43 |
| Theory | 75.35 | 8.96 | 7.33 |

Example 2

To 54 parts of stirred, cooled n-hexylamine is slowly added 90 parts of 37% formaldehyde followed by 82 parts of α-chlorocumene. After the addition is completed at 35° C., the cooling is removed and an exothermic reaction raises the temperature to 65° C. The mixture is stirred on a steam bath for three hours, cooled, poured into 300 parts of water, extracted with a toluene-heptane mixture, and made basic with excess 50% sodium hydroxide solution. The separated amine is taken up in toluene, dried over potassium carbonate and stripped free of toluene to 105° C. at 1.7 mm. Hg. The residue contained 90 parts with a neutral equivalent of 295. Theory for 3-n-hexyl-6-methyl-6-phenyltetrahydro-1,3-oxazine or 1-n-hexyl-4-phenyl-4-piperidinol is 261.

The basic residue from this reaction is distilled. A fraction of 24 parts of 3-n-hexyl-6-methyl-6-phenyltetrahydro-1,3-oxazine is collected at 130°–140° C./0.2 mm. Hg. This has a refractive index, $n_D^{25}$ of 1.5148 and a neutral equivalent of 263. The theoretical neutral equivalent for this material is 261.

A fraction of eight parts is collected at 150°–160° C./0.2 mm. Hg. This solidifies and is recrystallized from heptane to give six parts of 1-n-hexyl-4-phenyl-4-piperidinol, M. P. 97°–99° C. It has a neutral equivalent of 259. The theoretical neutral equivalent for this material is 261.

Example 3

To 54 parts of stirred, cooled benzylamine is slowly added 83 parts of 37% aqueous formaldehyde followed by 77 parts of α-chlorocumene. The mixture is stirred at 95° C. for three hours, cooled, diluted with 500 parts of water, extracted with a toluene-heptane mixture and made basic with excess ammonia. The liberated amine is taken up in toluene, dried over anhydrous potassium carbonate, and stripped free of toluene at 110° C. and 1.5 mm. Hg to a basic residue of 90 parts.

The basic residue from this reaction is distilled. A fraction of 22 parts of 3-benzyl-6-methyl-6-phenyltetrahydro-1,3-oxazine comes over at 150°–153° C./0.25 mm. Hg. This has a refractive index, $n_D^{25}$ of 1.5666 and a neutral equivalent of 267. The theoretical neutral equivalent for 3-benzyl-6-methyl-6-phenyl-tetrahydro-1,3-oxazine is 267.

A fraction distilling at 175°–184° C./0.25 mm. and consisting of nine parts is collected. This solidifies and is recrystallized from heptane to give seven parts of 1-benzyl-4-phenyl-4-piperidinol which melts at 105°–107° C. and has a neutral equivalent of 270. The theoretical neutral equivalent is 267 for 1-benzyl-4-phenyl-4-piperidinol.

Example 4

To 31 parts of 28% ammonia is slowly added with stirring and cooling 105 parts of 37% aqueous formaldehyde followed by 77 parts of α-chlorocumene, the temperature being maintained at 30° C. The mixture is stirred and heated at 95° C. for six hours, cooled, diluted with 300 parts of water, extracted with toluene and made basic with excess ammonia. The liberated basic material is extracted with toluene, dried over potassium carbonate, and stripped to a residue of 30 parts at 100° C./1.5 mm. Hg. Neutral equivalent is 236. This product is a mixture which contains 6-methyl-6-phenyl-1,3-oxazine, 4-phenyl-4-piperidinol, and some other materials.

Example 5

To 31 parts of stirred, cooled 28% ammonia is slowly added, below 30° C., 185 parts of 37% aqueous formaldehyde followed by 14 parts of ammonium chloride and 77 parts of α-chlorocumene. The mixture is stirred on a steam bath for six hours, cooled, diluted with 300 parts of water, extracted with toluene, and made basic with excess ammonia and sodium hydroxide solution. The liberated basic material is extracted with toluene, dried over anhydrous potassium carbonate, and stripped free of toluene to 54 parts of basic residue. This product is a mixture containing chiefly 6-methyl-6-phenyl-1,3-oxazine and 4-phenyl-4-piperidinol.

The basic residue from this reaction is distilled. A fraction of 16 parts of 6-methyl-6-phenyltetrahydro-1,3-oxazine, distilling at 80°–90° C./0.2 mm. is collected. This has a refractive index, $n_D^{25}$, of 1.5278 and a neutral equivalent for 6-methyl-6-phenyltetrahydro-1,3-oxazine is 177.

Example 6

Ninety parts of formaldehyde is added to 61 parts of β-phenylethylamine slowly with stirring and cooling. Eighty-two parts of α-chlorocumene is added and the mixture is heated at 97°–98° C. for 16 hours. After the reaction mixture is cooled, it is poured into 500 parts of water, and non-basic materials are removed by extraction with toluene. The toluene-insoluble material is made basic with excess ammonium hydroxide solution and the organic base is taken up in toluene, washed with water, and dried over anhydrous potassium carbonate. Distillation of the toluene extract gives nine parts of 1-(β-phenylethyl)-4-phenyl-4-piperidinol boiling at 165°–175° C./0.2 mm., which crystallizes upon cooling. After recrystallization from heptane, it melts at 99°–101° C., and contains 81.26% carbon, 8.31% hydrogen, and 4.95% nitrogen. The corresponding theoretical values for 1-(β-phenylethyl)-4-phenyl-4-piperidinol are 81.10%, 8.24% and 4.98% respectively.

The propionate ester of 1-(β-phenylethyl)-4-phenyl-4-piperidinol is of interest as an analgesic. Its hydrochloride melts at 209°–210° C.

I claim:

1. A process for preparing 6-methyl-6-phenyltetrahydro-1,3-oxazines and 4-phenyl-4-piperidinols which comprises mixing α-chlorocumene, formaldehyde, and a member of the class consisting of ammonia and primary amines of not over about eight carbon atoms and reacting them between about 20° and 100° C.

2. A process for preparing 6-methyl-6-phenyltetrahydro-1,3-oxazines and 4-phenyl-4-piperidinols which comprises reacting α-chlorocumene, formaldehyde, and a member of the class consisting of ammonia and primary amines of not over about eight carbon atoms between about 20° and 100° C., neutralizing the reaction mixture with a base, and separating the basic reaction products.

3. A process for preparing a mixture of 6-methyl-6-phenyltetrahydro-1,3-oxazine and 4-phenyl-4-piperidinol which comprises reacting α-chlorocumene, formaldehyde, and ammonia between about 20° and 100° C., rendering the reaction mixture basic by adding a base, and separating the basic reaction products.

4. A process for preparing 3,6-dimethyl-6-phenyltetrahydro-1,3-oxazine and 1-methyl-4-phenyl-4-piperidinol which comprises reacting α-chlorocumene, formaldehyde, and methylamine between about 20° and 100° C., rendering the reaction mixture basic by adding a base, and separating the basic reaction products.

5. A process for preparing 3-n-hexyl-6-methyl-6-phenyltetrahydro-1,3-oxazine and 1-n-hexyl-4-phenyl-4-piperidinol which comprises reacting α-chlorocumene, formaldehyde, and n-hexylamine between about 20° and 100° C., rendering the reaction mixture basic by adding a base, and separating the basic reaction products.

6. A process for preparing 3-benzyl-6-methyl-6-phenyltetrahydro-1,3-oxazine and 1-benzyl-4-phenyl-4-piperidinol which comprises reacting α-chlorocumene, formaldehyde, and benzylamine between about 20° and 100° C., rendering the reaction mixture basic by adding a base, and separating the basic reaction products.

References Cited in the file of this patent

UNITED STATES PATENTS 2,647,117    Hartough et al.   ---------- July 28, 1953

FOREIGN PATENTS 1,094,306    France ---------------- May 18, 1955